Figure 5:
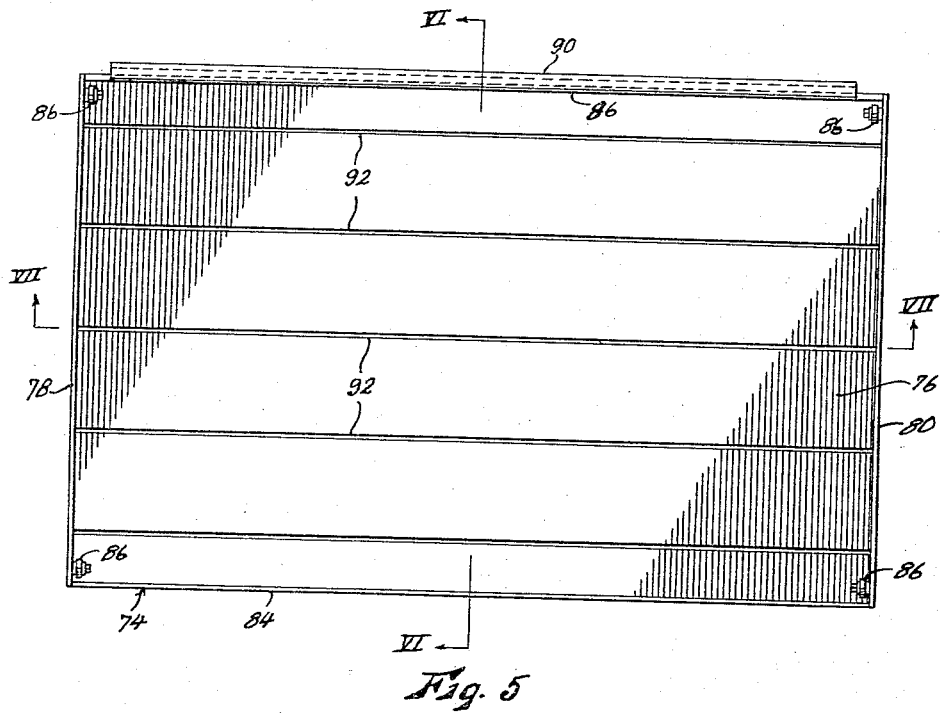

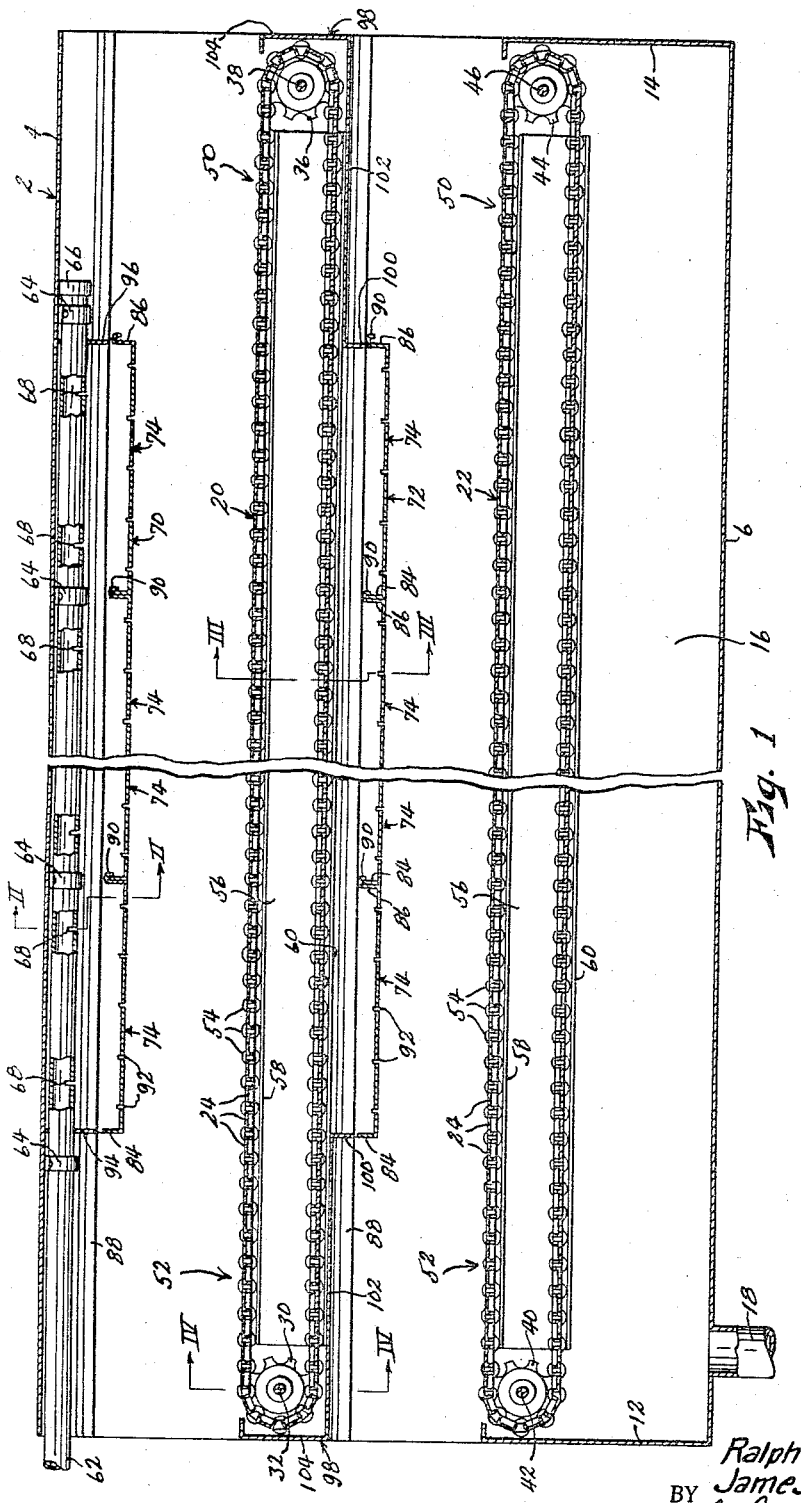

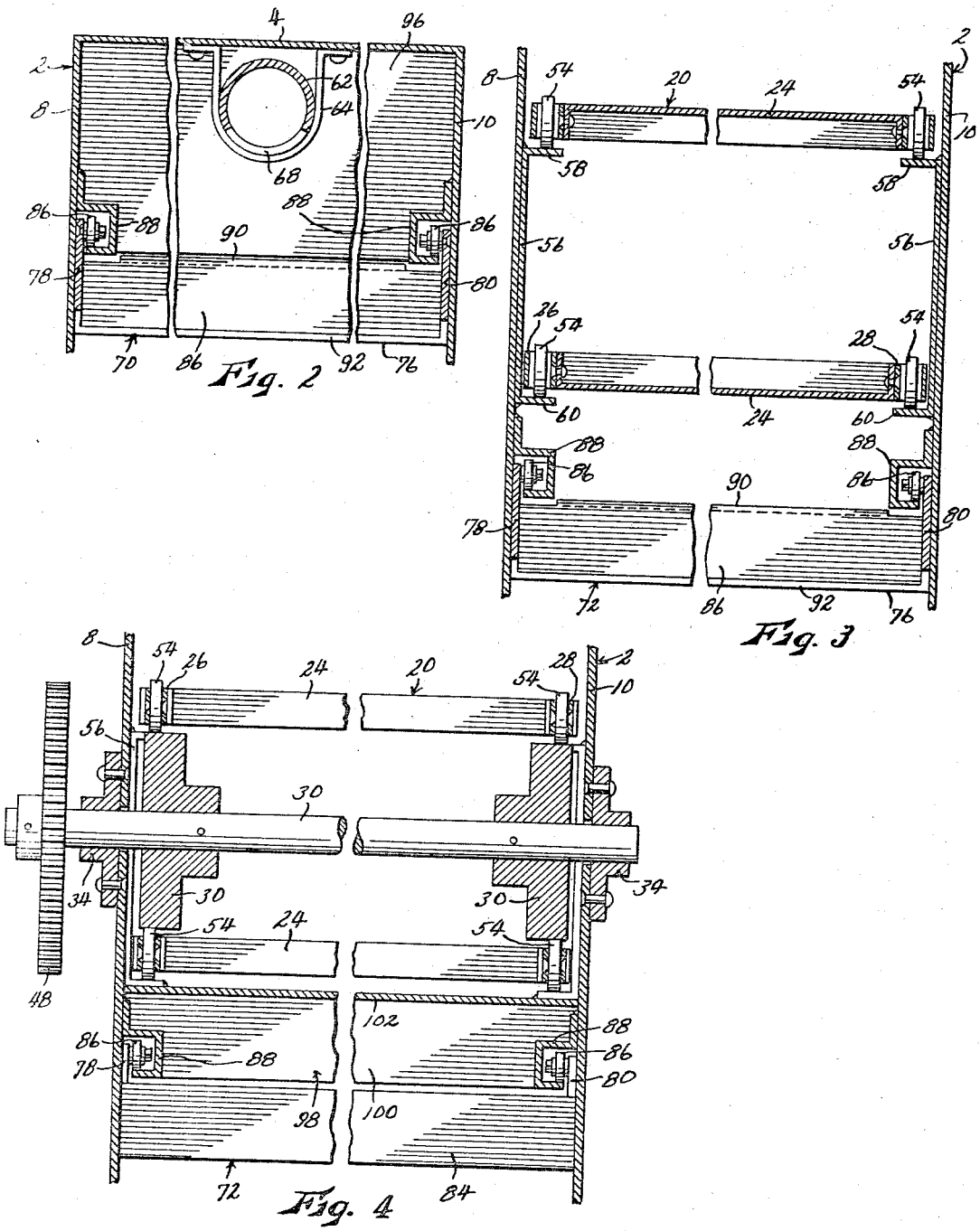

April 25, 1967 R. S. ZEBARTH ET AL 3,315,489
POULTRY FREEZING APPARATUS OF THE LIQUID SPRAY TYPE
Filed Dec. 20, 1965 3 Sheets-Sheet 3

INVENTORS.
Ralph S. Zebarth
James L. Gerner
BY
John A. Hamilton
Attorney.

United States Patent Office 3,315,489
Patented Apr. 25, 1967

3,315,489
POULTRY FREEZING APPARATUS OF THE
LIQUID SPRAY TYPE
Ralph S. Zebarth, Kansas City, Mo., and James L. Gerner,
Shawnee, Kans., assignors to Ralph Zebarth, Inc.,
Kansas City, Mo., a corporation of Missouri
Filed Dec. 20, 1965, Ser. No. 514,805
10 Claims. (Cl. 62—266)

This invention relates to new and useful improvements in poultry freezing apparatus, and has as its principal object the provision of an apparatus which will perform "surface" freezing of poultry carcasses or parts much more economically than has heretofore been possible with presently existing equipment.

In poultry processing plants, it is customary to subject freshly picked and dressed poultry carcasses and parts to a rapid "surface" freezing in order to preserve the fresh color and appearance thereof, and hence to enhance the attractiveness and saleability thereof. Once the surface thereof has been frozen to an acceptable depth, complete freezing of the entire internal mass thereof may be accomplished by slower, more economical methods. The surface freezing has heretofore been accomplished by placing the carcasses, usually wrapped in plastic or other protective bags or the like, on conveyor belts for travel through a suitable cabinet in which they are subjected to sprays or streams of a liquid refrigerant, usually at a temperature of about zero degrees Fahrenheit. Propylene glycol is usually employed as the refrigerant, since it is completely non-toxic. The spent refrigerant is gathered in to lower portion of the cabinet, from which it is pumped through refrigerating apparatus to return it to the desired low temperature, and recirculated to the spray nozzles.

A common problem in this class of apparatus arises from the fact that ordinarily large quantities of air pass through the cabinet together with the poultry carcasses being treated, and that due to the large temperature differential between this air and the refrigerant, large amounts of atmospheric moisture are condensed from the air and entrained in the refrigerant. The problem is particularly evident when the refrigerant employed is of a highly hygroscopic deliquescent nature such as propylene glycol, and the present invention is therefore particularly directed to freezers in which liquid refrigerants having a pronounced affinity for moisture are used. This water must be removed from the refrigerant if the efficiency of the process is to be maintained. For this purpose, the refrigerant is usually circulated through a "reconcentrator" in which it is first heated to boil off the water, and then again refrigerated to the desired temperature. This reconcentrator must be activated whenever the water content of the refrigerant reaches objectionably high levels, as indicated by the deposit of ice film on the carcasses or their wrapers, or the formation of icy slush in the refrigerant itself. The heating and refrigeration performed by the reconcentrator entails a substantial power expenditure which very materially and objectionably increases the cost of the overall operation. The problem is further aggravated by the fact that the frozen, wrapped carcasses must be rinsed to free them from excess refrigerant. This operation is usually performed by water sprays at the exit end of the freezer cabinet, and at least a portion of this moisture is entrained in air which enters the freezer cabinet, and which there is condensed into the refrigerant.

The solution of this problem is not simple. It is not practical to seal the freezer cabinet against the entry or circulation of air therein, since said cabinet must to a large extent be open for the entry and exit of the poultry carcasses being treated. Further, it is not practical to condition the air of the entire room in which the freezer is located in order to minimize the moisture content thereof.

Accordingly, the principal object of the present invention is accomplished by the provision of a freezer cabinet into which the refrigerant itself is introduced in such a manner as to form an efficient barrier to the entry or circulation of air therein.

Another object is the provision of a poultry freezer of the character described in which the refrigerant is not broken up into small droplets or the like, and hence is not as thoroughly exposed to any air which may be present, but which falls through the cabinet in the form of a large number of spaced apart, substantially solid and unbroken curtains or sheets which effectively bar the entry or circulation of air in the cabinet, so as to reduce the condensation and absorption of atmospheric moisture by said refrigerant. Reconcentration of the refrigerant may still be required, but only at more widely spaced intervals and with a greatly reduced power load.

Other objects are the formation of the cabinet and the means for producing the flowing curtains of refrigerant therein whereby said curtains more completely and effectively seal the cabinet against entry and circulation of air.

Other objects are simplicity of structure, economy of manufacture, ease and convenience of servicing, and efficiency and dependability of operation.

Figure 6:
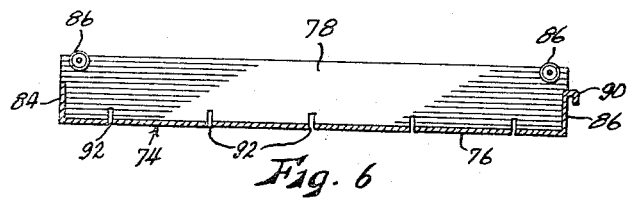
Figure 7:
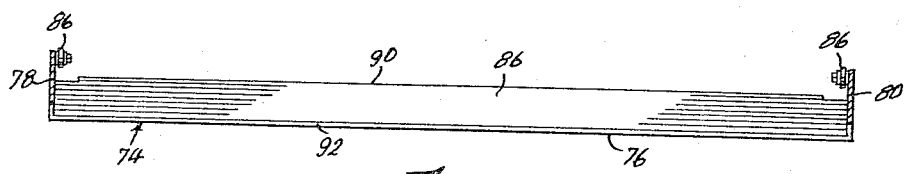

With these objects in view, as well as other objects which will appear in the course of the specification, reference will be had to the accompanying drawing, wherein:

FIG. 1 is a longitudinal, vertical sectional view of a poultry freezing apparatus embodying the present invention, partially broken away and foreshortened, FIG. 2 is an enlarged, fragmentary sectional view taken on line II—II of FIG. 1, partially broken away and foreshortened, FIG. 3 is an enlarged, fragmentary sectional view taken on line III—III, partially broken away and foreshortened, FIG. 4 is an enlarged, fragmentary sectional view taken on line IV—IV of FIG. 1, partially broken away and foreshortened, FIG. 5 is a top plan view of one of the refrigerant tray units, FIG. 6 is a sectional view taken on line VI—VI of FIG. 5, and FIG. 7 is a sectional view taken on line VII—VII of FIG. 5.

Like reference numerals apply to similar parts throughout the several views, and the numeral 2 applies generally to the cabinet of the freezer, said cabinet being formed of sheet metal and including a top wall 4, bottom wall 6, side walls 8 and 10, and being open at its ends except for abbreviated end walls 12 and 14 which extend upwardly from the respective ends of bottom wall 6, whereby the lower portion of said cabinet constitutes a tank 16 for collecting liquid refrigerant, from which tank said refrigerant may be drained through a pipe 18 communicating therewith through bottom wall 6. Disposed in the cabinet above tank 16 are a pair of vertically spaced apart conveyor belts 20 and 22 which extend horizontally for substantially the entire length of the cabinet. The lower of said belts, designated by the numeral 22, extends between the upper edge portions of end walls 12 and 14, while the upper belt, designated by the numeral 20, is spaced above belt 22. Said belts are transversely of a width to span the distance between side walls 8 and 10 almost completely, and are of open-work construction so that liquid may pass therethrough. As shown, each belt consists of a series of transversely extending, channel-shaped cross-bars 24, spaced apart so as to permit the passage of liquid therebetween, the ends of said cross-bars being connected respectively to a pair of sprocket chains 26 and 28 adjacent side walls 8 and 10 respectively. At one end of the cabinet, the chains 26 and 28 of upper belt 20 are trained about sprocket wheels 30 fixed on a shaft 32 rotatably mounted in bearings 34 mounted on side walls 8 and 10. At the opposite end of the cabinet, chains 26 and 28 of belt 20 are supported by sprockets 36 mounted on a shaft 38 carried rotatably by the cabinet. Similarly, the chains 26 and 28 of lower belt 22 are trained around sprockets 40 supported by a shaft 42 at one end of the cabinet, and about sprockets 44 carried by a shaft 46 at the opposite end of the cabinet. At least one of the sprocket shafts of each belt, as illustrated in connection with shaft 32 of the upper belt in FIG. 4, is extended outwardly from the cabinet and has mounted on the extended end thereof a gear wheel 48 for connection with any suitable powered driving means, not shown, whereby the associated belt is driven continuously in one direction. Although the direction of movement of the belts is not pertinent to the present invention, it may be assumed that the upper reaches of the belts travel from right to left as viewed in FIG. 1, the poultry carcasses, usually wrapped, being deposited thereon generally at 50, and removed therefrom at 52 after passing substantially through the full length of the cabinet. It will be seen that sprocket chains 26 and 28 are each provided at closely spaced intervals therealong with rotatably mounted rollers 54, and that each chain is supported intermediate its sprocket shafts by the engagement of said rollers with the flanges of a channel-shaped support 56 welded or otherwise affixed to the associated side wall 8 or 10 of the cabinet, the rollers of the upper reach of the chain resting on upper flange 58 of the support, and the rollers of the lower reach of the chain resting on the lower flange 60 of the support, as best shown in FIG. 3.

A liquid refrigerant such as propylene glycol is supplied to a pipe 62 extending longitudinally of the cabinet just below top wall 4 thereof, and suspended from said top wall by suitable hangers 64, said refrigerant being supplied to one end of the pipe while the other end of said pipe is closed by a cap 66 (see FIG. 1). At intervals within the cabinet, pipe 62 has apertures formed therein for directing streams of refrigerant downwardly through the cabinet. As shown in FIGS. 1 and 2, each of said apertures may consist of a peripherally extending slit 68 of considerable angular extent so as to direct a flat stream extending substantially the full width of the cabinet. At the same time, however, it does not break the stream up into a droplet spray, so that the exposure of the refrigerant to the air, and consequent consideration and entrapment of atmospheric moisture in the refrigerant is held to a minimum.

Directly beneath pipe 62, and spaced above the upper reach of upper belt 20, is a composite horizontal tray extending substantially the full length of the cabinet except that it does not extend over the loading and unloading zones 50 and 52 of the belt. Said tray is designated generally by the numeral 70, and an identical tray coextensive with tray 70 but disposed just beneath the lower reach of upper belt 20 but spaced above the upper reach of lower belt 22 is designated generally by the numeral 72. For convenience in removing and cleaning said trays periodically, each tray is formed of a series of individual tray units 74, one of said tray units being illustrated in detail in FIGS. 5–7. As there shown, each tray unit is formed of sheet metal, having a floor 76, upstanding side walls 78 and 80 adapted to engage slidably the side walls 8 and 10 respectively of the cabinet, and upstanding end walls 84 and 86 adapted to extend transversely of the cabinet. The side walls 78 and 80 each have a pair of rollers 86 rotatably mounted at the inner face of the upper edge thereof, said rollers being engaged in outwardly opening channels 88 welded or otherwise affixed to the inner surface of the associated cabinet side wall, whereby all of the units comprising each tray are supported in coplanar, end-to-end relation. Channels 88 extend the full length of the cabinet, whereby the tray units may be conveniently and rapidly removed from or inserted into the cabinet from either end. The upper edge portion of the end wall 86 of each tray unit is turned outwardly and downwardly to form a hook member 90 operable to engage the upper edge of end wall 84 of the adjacent tray unit, as shown in FIG. 1, whereby all of the units forming each tray are secured against separation. Formed in the floor 76 of each tray unit are a series of spaced apart slits 92 which extend the full width of said floor, so as to extend all the way to side walls 8 and 10 of the cabinet, and which also extend slightly upwardly from said floor into the side walls 78 and 80 of the tray, for a purpose which will presently appear.

Refrigerant supplied through pipe 62 passes through slits 68 of said pipe into upper tray 70, there being at least one slit disposed above each of the tray units 74, and the rate of refrigerant flow is maintained sufficiently high to maintain a positive liquid level in the tray despite the downward flow of refrigerant through slits 92 of the tray. In flowing through slits 92, the refrigerant is not broken up into a spray or droplets, but falls in solid, unbroken sheets or curtains, each of which forms a virtually positive barrier against the flow of air. This "barrier" effect of the flowing curtains of refrigerant is heightened by the extension of slits 92 slightly upwardly in the side walls 78–80 of the tray units. Without these extensions, it was found that the lateral edges of the refrigerant curtains tended to pull away from the side walls 8 and 10 of the cabinet, the curtains thus assuming a V-shape, so as to leave openings between the side walls and the edges of the curtains for the circulation of air drafts through the cabinet. The slit extensions as shown concentrate a sufficiently large excess of refrigerant at the sides of the cabinet to insure that the flowing curtains are retained in full contact with the cabinet side walls of the cabinet for the full height of said curtains, so that they can function efficiently as seals against the flow of air. Moreover, as the wrapped poultry carcasses are conveyed by belt 20 through the flowing refrigerant curtains, said refrigerant tends strongly to "cling" to said carcasses without appreciable splashing or splattering, so that in a large measure said carcasses traverse said curtains without breaking the air seals formed by said curtains.

After passing over the carcasses carried on upper belt 20, the refrigerant passes between the cross bars 20 of said belt and into lower tray 72, from which it again flows in curtains through slits 92 of said tray and over carcasses carried by lower belt 22. It then passes through belt 22 and is drained into tank 16 of the cabinet, from which it is removed through pipe 18 and pumped through a reconcentrator when necessary, is re-refrigerated, and returned to pipe 62 to repeat the cycle. In order for the refrigerant to flow effectively in "curtains" as described, and to have the clinging, non-splash effect described when passing over the poultry carcasses, it is important that said refrigerant possess a substantial degree of viscosity, as reflected by a somewhat syrupy consistency. Propylene glycol does possess this property in fully adequate degree. However, thinner, less viscous refrigerants could be made to perform adequately by reducing the vertical height of the curtains, and by designing tray slits 92 so as to produce a more streamlined flow, as by providing them with wide, parallel lips.

Thus, it will be seen that the primary concept of the present invention is that by breaking up the cabinet into a series of a large number of substantially sealed compartments formed by unbroken flowing curtains of refrigerant, most of said refrigerant is protected against any free-flowing drafts of air through the cabinet, thus greatly reducing the amount of atmospheric moisture which will be condensed by and entrained in the refrigerant. Some of the refrigerant, particularly the end-most curtains thereof at the ends of the cabinet, will still be exposed to circulating air, but in a long cabinet (lengths of 50 to 100 feet are common) this represents a very small proportion of the total refrigerant, so that a large proportion of the power consumed in heating and re-cooling the refrigerant in the reconcentration step may be saved. Solid curtains or flaps of rubber or the like could be installed at the ends of the cabinet so as to depend closely adjacent the surfaces of the conveyor belts. However, such flaps are common in the art and in any event are rather ineffective, since they must be almost continuously deflected to permit the deposit of carcasses on the belts and their removal from the belts at the other end of the cabinet.

In order to inhibit free circulation of air in the zone between top cabinet wall 4 and upper tray 70, there are provided a pair of baffle walls 94 and 96 (see FIGS. 1 and 2) fixed in the cabinet respectively in vertical alignment with the extreme ends of tray 70. Said baffles are pierced by pipe 62, extend downwardly from top cabinet wall 4, have their vertical edges affixed to side cabinet walls 8 and 10, and have their lower edges closely adjacent the upper edges of the respective extreme end walls 84 and 86 of the tray. In order to inhibit free circulation of air in the zone above lower tray 72 but below the upper reach of upper belt 20, there is provided a baffle wall 98 (see FIGS. 1 and 4) at each end of the cabinet. Each of said baffle walls also extends between and is affixed to side walls 8 and 10 of the cabinet, and has a lower vertical section 100 vertically aligned with the associated extreme end wall 84 or 86 of tray 72, the lower edge of wall 100 being closely adjacent the upper edge of said tray end wall, a horizontal section 102 extending from the upper edge of section 100 outwardly to the associated end of the cabinet, and a vertical section 104 extending upwardly from the outer edge of section 102 to enclose partially the sprockets and sprocket shafts of upper belt 20 at that end of the cabinet. End walls 12 and 14 of the cabinet extend upwardly to enclose partially the sprockets and sprocket chains of lower belt 22, thereby preventing free circulation of air in the zone between the upper reach of belt 22 and the liquid level in tank 16. The horizontal sections 102 of baffle walls 98 also prevent any excess refrigerant draining from the deposit and removal portions 50 and 52 of upper belt 20 from dripping through to the corresponding portions of lower belt 22, by causing such drippage to flow inwardly from the ends of the tank to be deposited in lower tray 72.

While we have shown and described a specific embodiment of our invention, it will be readily apparent that many minor changes of structure and operation could be made without departing from the spirit of the invention as defined by the scope of the appended claims.

What we claim as new and desire to protect by Letters Patent is:

1. A poultry freezing apparatus of a type utilizing a hygroscopic liquid refrigerant comprising:
    (a) a cabinet defining a horizontal path of travel,
    (b) a conveyor operable to convey poultry to be frozen along said horizontal path through said cabinet, said cabinet being open at the respective ends of said path,
    (c) flow control means within said cabinet and operable to direct a hygroscopic liquid refrigerant downwardly over the poultry carried by said conveyor in the form of a series of continuous unbroken flowing curtains, said curtains being spaced apart longitudinally to the path of travel and extending transversely to said path of travel from side to side of said cabinet, whereby to inhibit free circulation of air within said cabinet.

2. A poultry freezing apparatus as recited in claim 1 wherein said flow control means comprises a horizontal tray disposed above said conveyor and adapted to receive said refrigerant therein, said tray having a series of spaced apart, continuous slits formed in the floor thereof, said slits extending transversely to said path of travel to the full width of said cabinet.

3. A poultry freezing apparatus as recited in claim 1 wherein said cabinet includes parallel, vertical side walls extending parallel to said path of travel, and wherein said flow control means comprises a tray disposed above said conveyor and adapted to receive said refrigerant therein, said tray including a horizontal floor and upstanding side walls respectively closely adjacent said cabinet side walls, said floor having a series of spaced apart, continuous slits formed therethrough and extending the full width of said tray between the side walls thereof.

4. A poultry freezing apparatus as recited in claim 3 wherein said slits in said tray floor extend the full width of said tray floor and are further extended above said floor into the side walls of said tray, whereby refrigerant flowing through said extended portions of said slits is directed horizontally outwardly against the side walls of said cabinet.

5. A poultry freezing apparatus as recited in claim 1 wherein said liquid refrigerant is of a material possessing a substantial degree of viscosity.

6. A poultry freezing apparatus as recited in claim 1 wherein said liquid refrigerant comprises propylene glycol.

7. A poultry freezing apparatus as recited in claim 2 wherein said tray is of substantial longitudinal length in the direction of said path of travel, and is divided longitudinally into a series of tray units, each of said tray units being provided with supporting rollers, and with the addition of support members extending horizontally the length of said cabinet for supporting the rollers of all of said tray units in rolling engagement therewith, whereby said tray units may be conveniently removed from said cabinet one at a time for servicing.

8. A poultry freezing apparatus as recited in claim 7 wherein each of said tray units is provided with means detachably interconnecting it with the next adjacent tray units, whereby said tray units are prevented from separating by movement of the rollers thereof on said support members.

9. A poultry freezing apparatus as recited in claim 1 wherein said conveyor has the form of an openwork belt whereby liquid refrigerant may pass therethrough, and with the addition of a second conveyor belt similar to said first-named conveyor belt but disposed beneath and parallel to said first-named conveyor belt, and a second flow control means similar to said first-named flow control means disposed beneath said first conveyor belt to receive refrigerant passing through said first belt, but spaced above said second belt whereby to direct curtains of refrigerant downwardly over poultry carried by said second belt.

10. A poultry freezing apparatus as recited in claim 9 with the addition of baffles inhibiting free circulation of air in the horizontally extending zones of the cabinet between the top of said cabinet and said first flow control means, between the poultry supporting surface of said first conveyor and said second flow control means, and beneath the poultry supporting surface of said second conveyor.

References Cited by the Examiner
UNITED STATES PATENTS

| | | | |
|---|---|---|---|
| 2,247,865 | 7/1941 | Zarotschenzeff et al. | 62—64 |
| 2,940,458 | 6/1960 | Speckman | 62—374 X |
| 3,006,774 | 10/1961 | Zebarth | 99—192 |
| 3,101,383 | 8/1963 | Paris | 239—568 X |
| 3,173,276 | 3/1965 | Martin | 62—380 |

ROBERT A. O'LEARY, *Primary Examiner.*

W. E. WAYNER, *Assistant Examiner.*